(12) United States Patent
Nakamura

(10) Patent No.: US 12,078,722 B2
(45) Date of Patent: Sep. 3, 2024

(54) DISTANCE MEASUREMENT DEVICE AND RELIABILITY DETERMINATION METHOD

(71) Applicant: NUVOTON TECHNOLOGY CORPORATION JAPAN, Kyoto (JP)

(72) Inventor: Seiji Nakamura, Osaka (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 898 days.

(21) Appl. No.: 17/154,778

(22) Filed: Jan. 21, 2021

(65) Prior Publication Data

US 2021/0141090 A1     May 13, 2021

Related U.S. Application Data

(63) Continuation of application No. PCT/JP2019/024096, filed on Jun. 18, 2019.

(51) Int. Cl.
*G01S 17/10*    (2020.01)
*G01S 7/481*    (2006.01)
(Continued)

(52) U.S. Cl.
CPC ............ *G01S 17/10* (2013.01); *G01S 7/4816* (2013.01); *G01S 7/484* (2013.01); *G01S 7/4868* (2013.01); *G01S 17/894* (2020.01); *H04N 23/73* (2023.01)

(58) Field of Classification Search
CPC ........ G01S 17/10; G01S 7/4816; G01S 7/484; G01S 7/4868; G01S 17/894;
(Continued)

(56) References Cited

U.S. PATENT DOCUMENTS

2016/0178734 A1    6/2016    Kawamura et al.
2021/0183096 A1*   6/2021    Yokokawa ............... G06T 7/74

FOREIGN PATENT DOCUMENTS

JP    2006-105694 A    4/2006
WO    2008/152095 A1   12/2008
(Continued)

OTHER PUBLICATIONS

Translation of description of Kurihara et al., JP 2006-105694, 56 pages. (Year: 2024).*

(Continued)

*Primary Examiner* — Daniel L Murphy
(74) *Attorney, Agent, or Firm* — Rimon P.C.

(57) ABSTRACT

A distance measurement device includes: an emission and exposure controller which controls emission timing and an emission period of irradiation light for an emitter and controls exposure timing and an exposure period of reflected light for a solid-state image sensor; and a data processor which includes a calculator that calculates distance data and light intensity data based on signals of pixels outputted by a light receiver. The emission and exposure controller controls the exposure timing to perform exposure to reflected light from a first distance and not to perform exposure to reflected light from a second distance longer than the first distance in a distance measurement range. The data processor includes a determination unit which determines reliability of the distance data in accordance with a signal amount of the light intensity data for each of the pixels.

11 Claims, 16 Drawing Sheets

(51) Int. Cl.
    *G01S 7/484*     (2006.01)
    *G01S 7/486*     (2020.01)
    *G01S 17/894*    (2020.01)
    *H04N 23/73*     (2023.01)

(58) Field of Classification Search
    CPC ............... G01S 7/4865; G01S 7/4811; G01S 2007/4975; G01S 7/497; G01S 17/89; H04N 5/2353; H04N 23/73; H04N 23/00; H04N 23/71; H04N 23/56; H04N 23/60; G03B 7/16; G03B 15/05
    USPC ....................................................... 356/5.01
    See application file for complete search history.

(56)            References Cited

FOREIGN PATENT DOCUMENTS

WO      2014/207983 A1    12/2014
WO      2017/159312 A1     9/2017

OTHER PUBLICATIONS

International Search Report and Written Opinion issued on Aug. 20, 2019 in International Patent Application No. PCT/JP2019/024096; with partial English translation.

\* cited by examiner

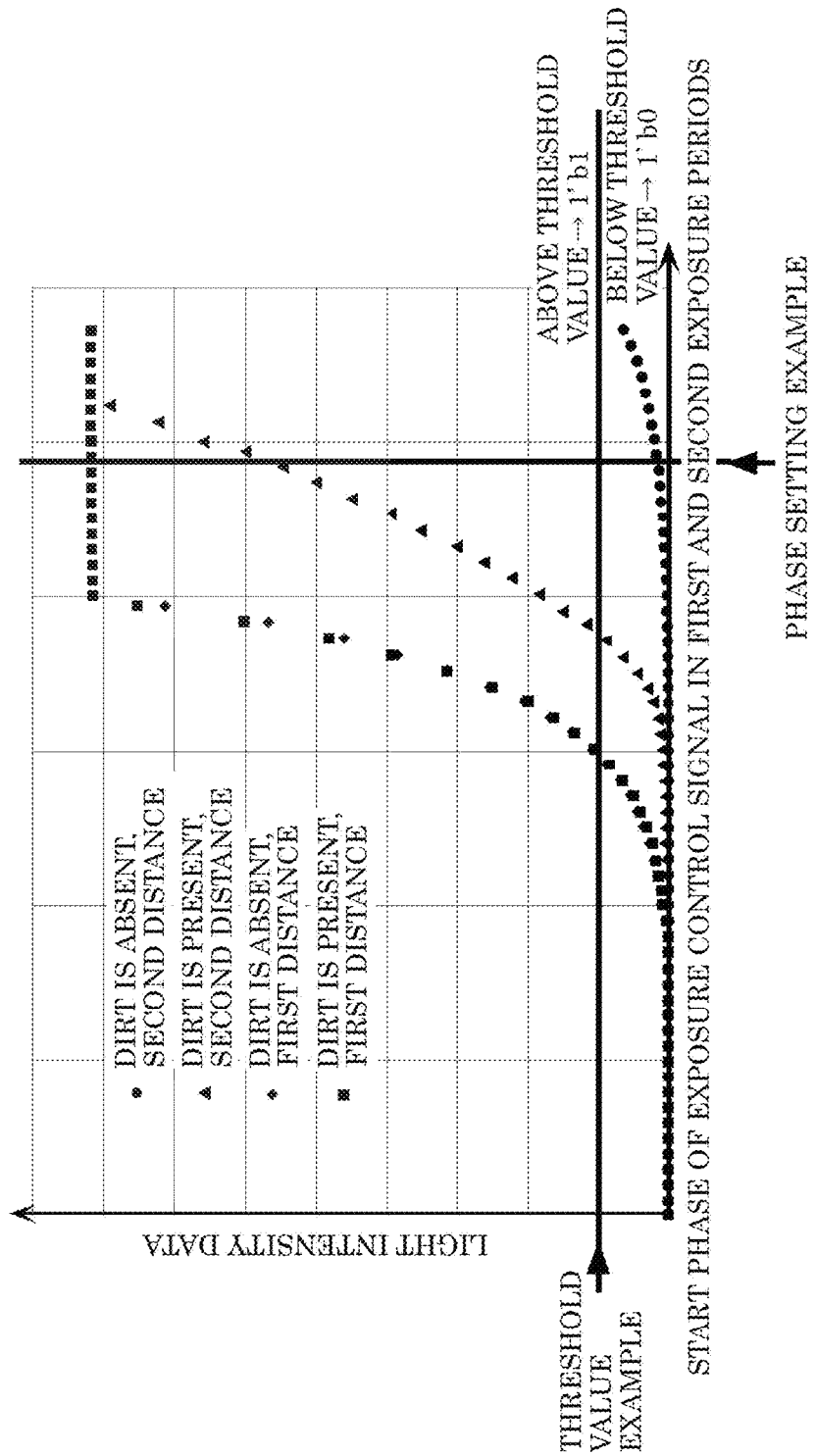

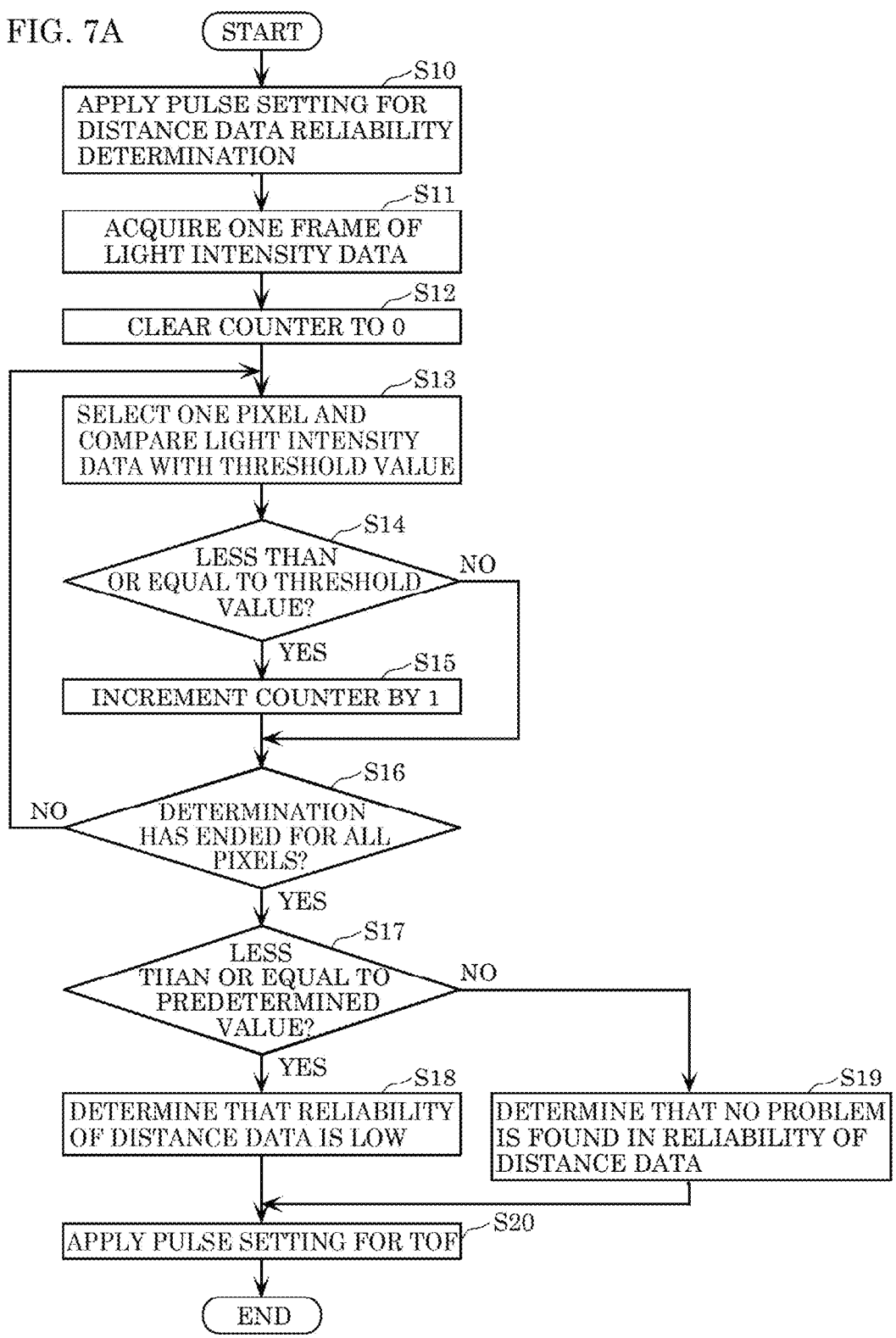

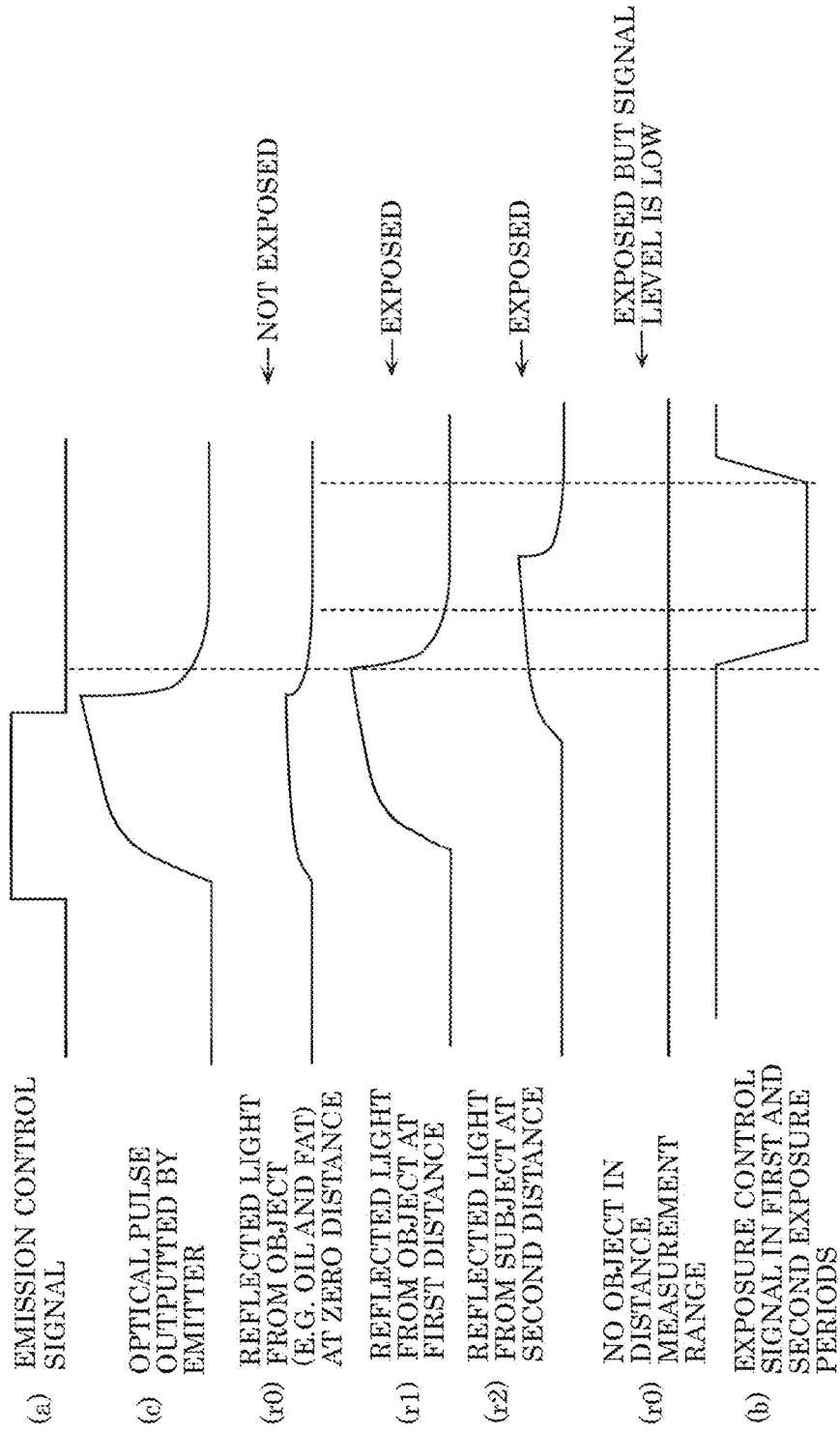

FIG. 9

| OBJECT | RESULTS OF LIGHT INTENSITY DETERMINATION FOR EACH PIXEL | | OBJECT PRESENCE OR ABSENCE DETERMINATION |
|---|---|---|---|
| | DIRT IS ABSENT | DIRT IS PRESENT | |
| (a1) OBJECT IS ABSENT IN DISTANCE MEASUREMENT RANGE — FIRST DISTANCE / FIRST DISTANCE | (b1) 0 (LOWER THAN THRESHOLD VALUE) / 1 (HIGHER THAN THRESHOLD VALUE) / 1 | (c1) 1 | (d1) 0 (OBJECT IS ABSENT) / 1 |
| (a2) THIRD DISTANCE CM / FIRST DISTANCE / FIRST DISTANCE | (b2) 1 | (c2) 1 | (d2) 1 |

DISTANCE MEASUREMENT DEVICE AND RELIABILITY DETERMINATION METHOD

CROSS REFERENCE TO RELATED APPLICATIONS

This application is a U.S. continuation application of PCT International Patent Application Number PCT/JP2019/024096 filed on Jun. 18, 2019, claiming the benefit of priority of U.S. Provisional Patent Application No. 62/701,992 filed on Jul. 23, 2018, the entire contents of which are hereby incorporated by reference.

BACKGROUND

1. Technical Field

The present disclosure relates to a distance measurement device and a reliability determination method and more specifically to a distance measurement device for TOF and a reliability determination method.

2. Description of the Related Art

International Publication No. WO2008/152095 (Patent Literature (PTL) 1) discloses a dirt detection method in a flight time (TOF) range image system. In the dirt detection method, the total number of pixels at which an amplitude signal of a continuous wave time-of-flight (CW-TOF) type is less than or equal to a predetermined signal level is counted, and when the aforementioned number is smaller than a threshold value which is based on a count number serving as a reference under the absence of dirt, it is determined that dirt is present. For example, a count number is assumed as known reference data based on passenger detection (for example, unmanned, manned, the presence of a child seat) in a vehicle compartment.

SUMMARY

However, in PTL 1, scenes and objects to be photographed by a TOF camera are determined to some extent, and it is useful only in a case where measurement data (the aforementioned count value) serving as a reference under the absence of dirt can be used.

The present disclosure provides a distance measurement device and a reliability determination method which detect deterioration in the reliability of distance data due to, for example, oil and fat dirt of cover glass without using measurement data obtained under the absence of dirt.

A distance measurement device according to one aspect of the present disclosure includes an emitter which emits irradiation light in accordance with an emission instruction; a light receiver which includes a solid-state image sensor that performs exposure using reflected light corresponding to the irradiation light; an emission and exposure controller which controls emission timing and an emission period of the irradiation light for the emitter and controls exposure timing and an exposure period of the reflected light for the solid-state image sensor; and a data processor which includes a calculator that calculates distance data and light intensity data based on signals of pixels outputted by the light receiver. The emission and exposure controller controls the exposure timing to perform exposure to reflected light from a first distance and not to perform exposure to reflected light from a second distance longer than the first distance in a distance measurement range. The data processor includes a determination unit which determines reliability of the distance data in accordance with a signal amount of the light intensity data for each of the pixels.

Note that these comprehensive or detailed aspects may be realized by a system, a method, an integrated circuit, a computer program, or a recording medium such as a computer-readable CD-ROM or may be realized by combining together the system, the method, the integrated circuit, the computer program, and the recording medium in a desired manner.

With the distance measurement device and the reliability determination method of the present disclosure, it is possible to detect deterioration in the reliability of the distance data due to, for example, oil and fat dirt of cover glass on the front surface of a TOF camera without using the distance data obtained under the absence of dirt.

BRIEF DESCRIPTION OF DRAWINGS

These and other objects, advantages and features of the disclosure will become apparent from the following description thereof taken in conjunction with the accompanying drawings that illustrate specific embodiments of the present disclosure.

FIG. 6A is a diagram illustrating a threshold value in the distance data reliability determination according to Embodiment 1;

FIG. 7A is a flowchart illustrating a first operation example of the distance data reliability determination according to Embodiment 1;

FIG. 8 is a diagram illustrating an example of pulse setting for detecting the presence or absence of an object according to Embodiment 2;

FIG. 9 is a diagram illustrating object presence or absence determination and reliability determination according to Embodiment 2;

DETAILED DESCRIPTION OF THE EMBODIMENTS (Knowledge for the Basis of Present Disclosure)

Regarding a distance measurement device described in "Background Art", the inventor of the present disclosure has found out that the following problem arises.

In PTL 1, in addition to the problem that it is useful only in a case where the measurement data (the aforementioned count value) obtained under the absence of dirt can be used as a reference, there may arise a problem that the reliability of distance data measured deteriorates as a result of, for example, grasping, carrying, and operating distance measurement device 100 by a user particularly when distance measurement device 100 is loaded as a camera in a smartphone.

Figure 1:
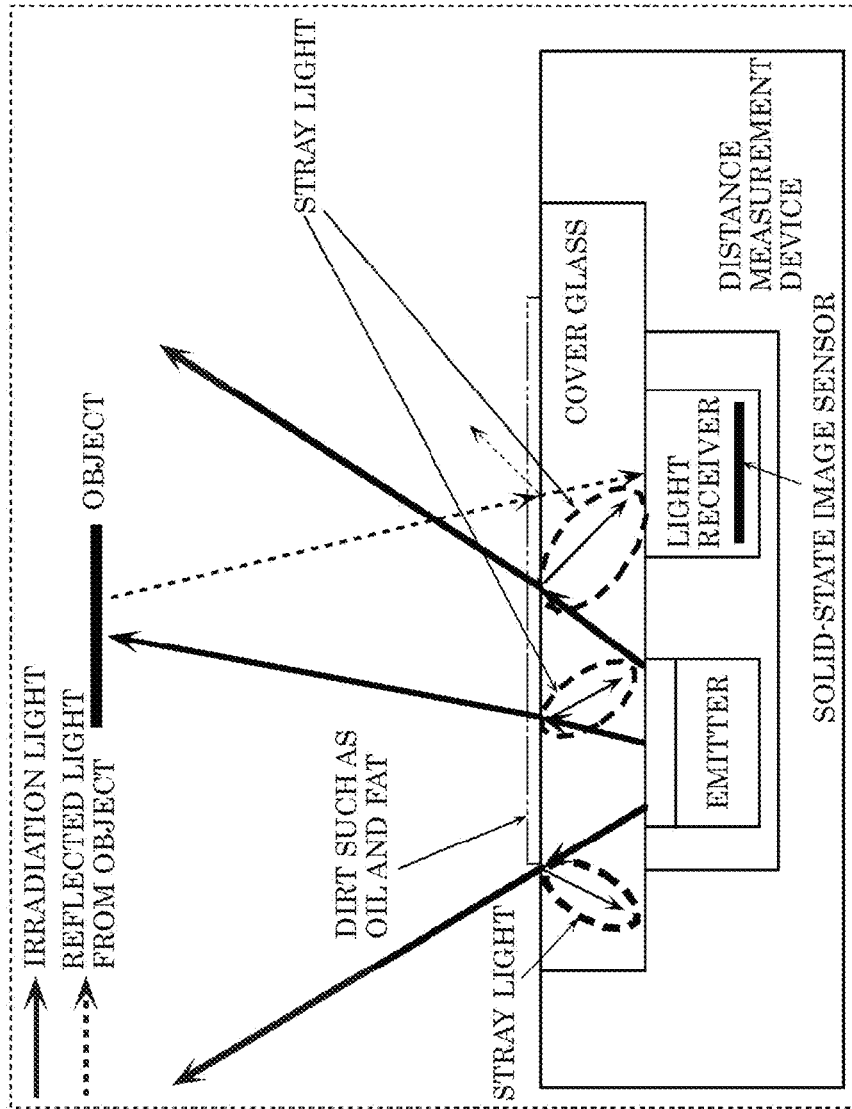
FIG. 1 is a diagram illustrating a factor of deterioration in the reliability of distance data due to dirt on cover glass of a distance measurement device.

FIG. 1 is a diagram illustrating a factor of deterioration in the reliability of distance data due to dirt of cover glass of the distance measurement device. The figure schematically illustrates relationship between the distance measurement device, irradiation light, and reflected light. The distance measurement device in the figure includes an emitter, a light receiver, and cover glass. The emitter emits pulse-like irradiation light. The light receiver has a solid-state image sensor which receives reflected light from an object. The cover glass covers the emitter and the light receiver for protecting the emitter and the light receiver.

The distance measurement device is loaded in, for example, a smartphone. When distance measurement device 100 is loaded as a TOF camera in the smartphone, the surface of the cover glass makes contact with a human finger or ear in many cases. Thus, dirt such as oil and fat, sebum, cosmetics, hair cream, dust, etc. adheres to the surface of the cover glass in many cases.

Irradiation light from the emitter hits the oil and fat, the sebum, the cosmetics, the hair cream, the dust, etc. adhering to the surface of the cover glass and is partially reflected upon passage through the cover glass, turning into stray light. As is the case with reflected light at a zero distance, the stray light is partially taken into the light receiver which deteriorates the accuracy of the distance data.

To solve such a problem, a distance measurement device according to one aspect of the present disclosure includes: an emitter which emits irradiation light in accordance with an emission instruction; a light receiver which includes a solid-state image sensor that performs exposure using reflected light corresponding to the irradiation light; an emission and exposure controller which controls emission timing and an emission period of the irradiation light for the emitter and controls exposure timing and an exposure period of the reflected light for the solid-state image sensor; and a data processor which includes a calculator that calculates distance data and light intensity data based on signals of pixels outputted by the light receiver. The emission and exposure controller controls the exposure timing to perform exposure to reflected light from a first distance and not to perform exposure to reflected light from a second distance longer than the first distance in a distance measurement range. The data processor includes a determination unit which determines the reliability of distance data in accordance with a signal amount of the light intensity data for each of the pixels.

Consequently, any pixel corresponding to an object located farther from the second distance receives only light reflected by oil and fat dirt of the cover glass, which can generate a signal level difference due to the presence and absence of the oil and fat dirt. As described above, it is possible to determine the reliability of the distance data by use of the signal level difference arising under the presence of the oil and fat dirt of the cover glass.

Note that these comprehensive or detailed modes may be realized by a system, a method, an integrated circuit, a computer program, or a recording medium such as a computer-readable CD-ROM or may be realized by combining together the system, the method, the integrated circuit, the computer program, and the recording medium in a desired manner.

Hereinafter, the embodiments will be described in detail with reference to the drawings.

Note that embodiments described below each illustrate a comprehensive or detailed example. Numerical values, shapes, materials, components, arrangement positions and connection modes of the components, steps, a sequence of the steps, etc. illustrated in the embodiments below each form just one example and are not intended to limit the present disclosure. Moreover, among the components in the embodiments below, those not described in an independent claim indicating a realization mode according to one aspect of the present disclosure will be described as optional components. The realization mode of the present disclosure is not limited to the current independent claim and can also be expressed by any other independent claim.

The reliability used in the embodiments described below means probability (accuracy) that distance data obtained through calculation is real distance data (accurate distance data).

Determining the reliability means determining whether the distance data obtained through the calculation is real distance data or false distance data (pseudo distance data).

"Reliability is low (deteriorates)" means that the probability that the distance data obtained through the calculation is real distance data is low (probability deteriorates).

Moreover, no problem is found in the reliability means that the probability that the distance data obtained through the calculation is real distance data is high.

Embodiment 1

Distance measurement device 100 according to the present embodiment controls the exposure timing to perform exposure to reflected light from the first distance and not to perform exposure to reflected light from the second distance longer than the first distance.

With any pixel corresponding to an object located farther than the second distance, only light reflected by oil and fat dirt of the cover glass is used for exposure, which makes it possible to bring about a signal level difference due to the presence and absence of the oil and fat dirt. Distance measurement device 100 uses such a signal level difference to determine whether or not the reliability of the distance data deteriorates.

Figure 2:
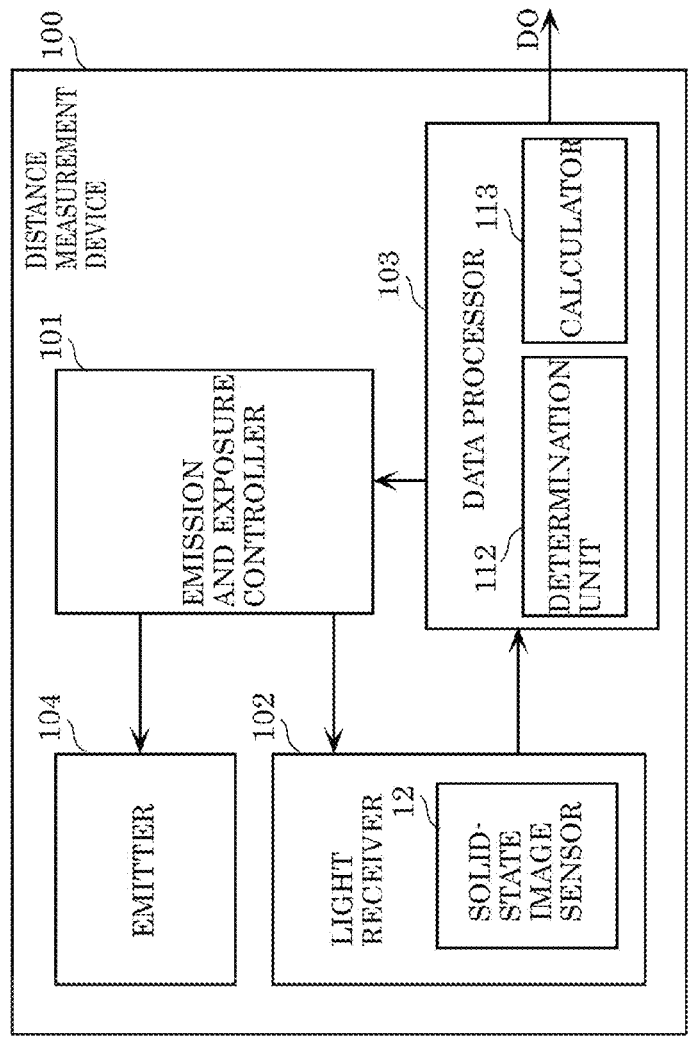
FIG. 2 is a block diagram illustrating a configuration example of a distance measurement device according to Embodiment 1.

FIG. 2 is a block diagram illustrating a configuration example of a distance measurement device according to Embodiment 1. In addition to distance measurement device 100, an object OBJ is illustrated in the figure.

Distance measurement device 100 in the figure includes emission and exposure controller 101, light receiver 102, data processor 103, and emitter 104. Light receiver 102 includes solid-state image sensor 12. Data processor 103 includes determination unit 112 and calculator 113.

Emission and exposure controller 101 controls emission timing and an emission period of irradiation light for emitter 104 and controls exposure timing and an exposure period of reflected light for solid-state image sensor 12.

Emission and exposure controller 101 performs, in addition to the emission and exposure control for normal distance measurement, emission and exposure control for reliability determination. In the emission and exposure control for the reliability determination, emission and exposure controller 101 controls the exposure timing to perform exposure to reflected light from the first distance and not to perform exposure to reflected light from the second distance longer than the first distance in a distance measurement range. Note that the reflected light from the first distance means reflected light from an object located at the first distance. Similarly, the reflected light from the second distance means reflected light from the object located at the second distance.

Light receiver 102 has solid-state image sensor 12 which performs exposure using reflected light corresponding to irradiation light in accordance with the exposure control performed by emission and exposure controller 101.

Data processor 103 includes: calculator 113 which calculates distance data and light intensity data based on signals of pixels outputted by light receiver 102; and determination unit 112 which determines the reliability of the distance data in accordance with a signal amount of the light intensity data for each of the pixels. Data processor 103 displays the distance data on, for example, a display such as an LCD and causes output of a message indicating that the reliability of the distance data is low.

Emitter 104 emits irradiation light in accordance with the emission control performed by emission and exposure controller 101.

Next, the emission and exposure control for the normal distance measurement will be described.

Figure 3:
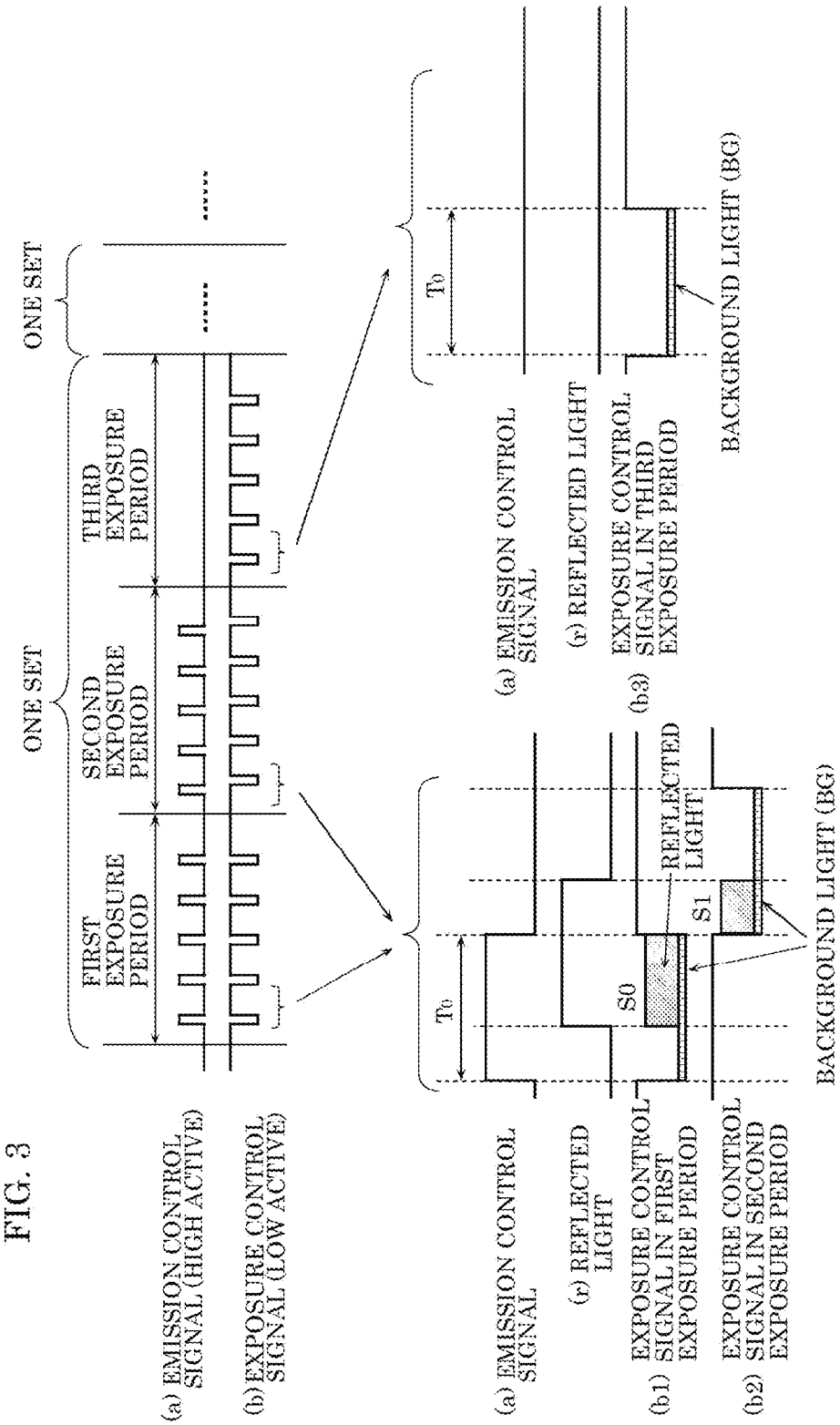
FIG. 3 is a time chart illustrating an example of pulse setting for distance measurement according to Embodiment 1.

FIG. 3 is a time chart illustrating an example of pulse setting for distance measurement according to Embodiment 1. A horizontal axis represents a time axis and a vertical axis represents a logic level or a signal level of each signal in the figure.

Emitter 104 emits light to an outside in accordance with timing indicated by an emission control signal inputted.

An emission control signal (a) is an active and high-level signal for emission and exposure controller 101 to instruct emitter 104 to emit light. Emitter 104 emits light in a period in which the emission control signal (a) is at a high level and lights off when the emission control signal (a) is at a low level. Emitter 104 may be a light-emitting diode (LED), a laser diode (LD), or a vertical cavity surface emitting LASER (VCSEL).

An exposure control signal (b) is an active and low-level signal for emission and exposure controller 101 to instruct solid-state image sensor 12 for exposure. Solid-state image sensor 12 performs exposure in a period in which the exposure control signal (b) is at a low level and does not perform exposure in a period in which the exposure control signal (b) is at a high level. The exposure here refers to a phenomenon that photoelectric conversion is performed on pixels of solid-state image sensor 12 and signal electric charges generated through the photoelectric conversion are accumulated. Solid-state image sensor 12 in light receiver 102 may be a CCD sensor or a CMOS sensor. In light receiver 102, light from the outside is taken in based on the exposure control signal and a digital signal in accordance with an exposure amount is outputted. Emission and exposure controller 101 outputs an exposure control signal to solid-state image sensor 12. The exposure control signal is a digital signal of a binary value of "H" and "L". In the present embodiment, "L" means exposure and "H" means exposure stop.

As illustrated in an upper portion of the figure, emission and exposure controller 101 repeats, in the emission and exposure control for the normal distance measurement, a plurality of sets each of which includes a first exposure period, a second exposure period, and a third exposure period. One frame of distance data is calculated by repeating N sets. To ensure a sufficient signal amount as the distance data, the total number of times of toggling the emission control signals and the exposure control signals in a total of N sets is increased.

As illustrated on the left of a lower portion of the figure, the first exposure period is formed by repeating a basic unit including a set of the emission control signal (a) and exposure control signal (b1) a plurality of numbers of times. An example in which the basic unit is repeated five times is illustrated, and the first exposure period, the second exposure period, and the third exposure period have to be repeated the same number of times in the figure. The basic unit is repeated five times in the figure but the total number of times of the repetition is not limited to five. Signal amount S0 and background light BG are acquired in the first exposure period.

As illustrated on the left of the lower portion of the figure, the second exposure period is formed by repeating a basic unit including a set of the emission control signal (a) and exposure control signal (b2) a plurality of times. An example in which the basic unit is repeated five times is illustrated in the figure, but the total number of times of the repetition is not limited to five. Signal amount S1 and the background light BG are acquired in the second exposure period.

As illustrated on the right of the lower portion of the figure, the third exposure period is formed by repeating a basic unit including a set of the emission control signal (a) which does not instruct emission and exposure control signal (b3) a plurality of times. An example in which the basic unit is repeated five times is illustrated in the figure, but the total number of times of the repetition is not limited to five. The background light BG is acquired in the third exposure period.

A light intensity signal for each pixel is expressed by an equation below.

Light intensity signal=$(S0 \cdot BG)+(S1 \cdot BG)$.

The total number of times of repeating the emission and exposure control signals may be increased to increase the light intensity signal. Note that the light intensity signal is also called light intensity data.

Moreover, distance data L for each pixel is obtained by an equation below:

$L=c \cdot T0/2=(S1 \cdot BG)/((S0 \cdot BG)+(S1 \cdot BG))$.

Here, c represents a light speed. S0 is a signal level for a sum of N sets of background light and reflected light which are used for exposure in the first exposure period. S1 is a signal level for a sum of N sets of background light and reflected light which are used for exposure in the second exposure period. BG is a signal level for a sum of N sets of background light which is used for exposure in the third exposure period.

Next, the emission and exposure control for distance data reliability determination will be described.

Figure 4A:
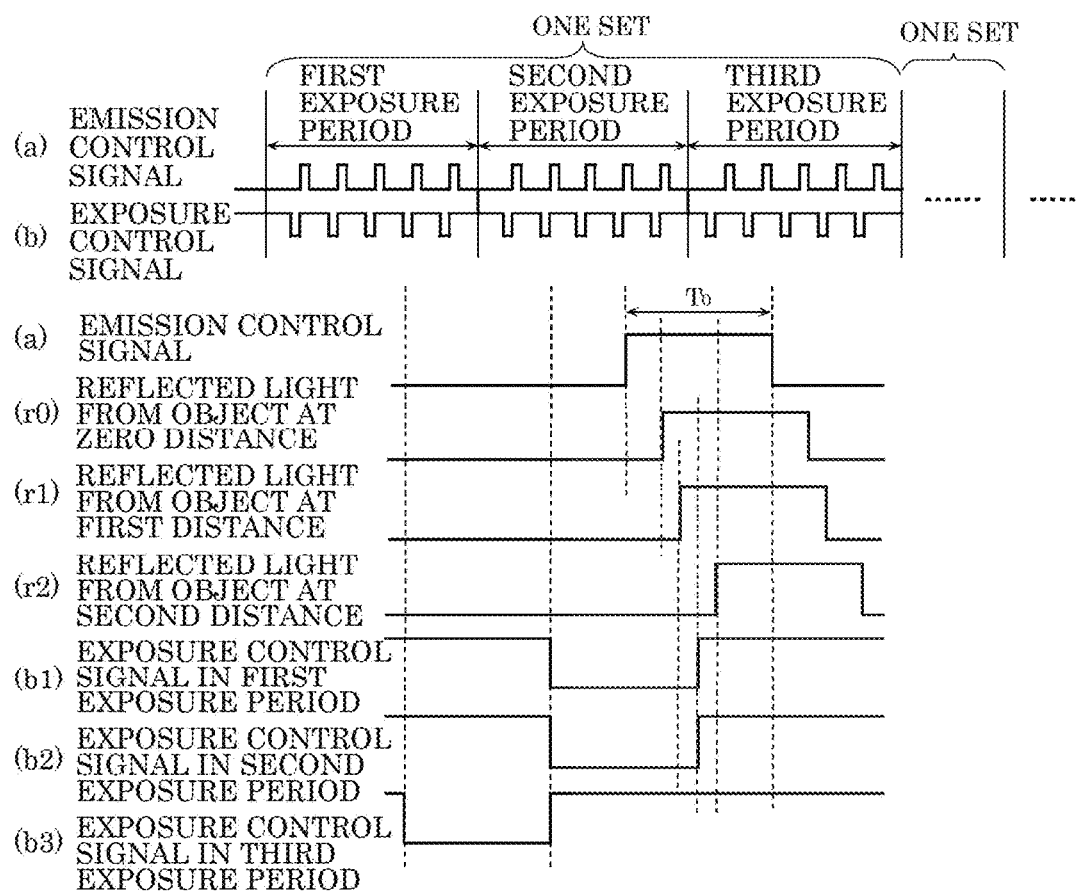
FIG. 4A is a time chart illustrating an example of pulse setting for distance data reliability determination (for dirt detection) according to Embodiment 1.
Figure 4B:
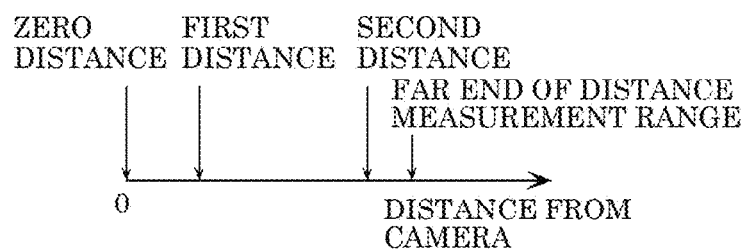
FIG. 4B is a diagram illustrating a zero distance, a first distance, and a second distance according to Embodiment 1.

FIG. 4A is a time chart illustrating an example of pulse setting for the distance data reliability determination (for dirt detection) according to Embodiment 1. FIG. 4B is a diagram illustrating the zero distance, the first distance, and the second distance according to Embodiment 1. The zero distance of the figure corresponds to reflected light on the surface of the cover glass. The far end of the distance measurement range refers to a far end of the distance measurement range measurable by distance measurement device 100. Assumed here is that the measurable distance measurement range is from the zero distance to the far end of the distance measurement range. The first distance is greater than the zero distance and smaller than the second distance in the distance measurement range. The second distance is greater than the first distance and smaller than the far end of the distance measurement range in the distance measurement range.

In FIG. 4A, as is the case with FIG. 3, one frame is formed by N sets each of which includes the first exposure period, the second exposure period, and the third exposure period. The aforementioned state is provided because a large portion of an emission control operation for the distance measurement is used as the emission and exposure control for the reliability determination in emission and exposure controller 101. The first exposure period and the second exposure period are discriminated in FIG. 4A, but the first exposure period and the second exposure period are not different but identical to each other without any difference.

In FIG. 4A, the first exposure period is formed by repeating a basic unit including an emission control signal (a) and exposure control signal (b) a plurality of times. Exposure control signal (b) is set at timing at which exposure to reflected light from the first distance is performed and exposure to reflected light from the second distance longer than the first distance in the distance measurement range is not performed.

The second exposure period is formed by repeating a basic unit including the emission control signal (a) and exposure control signal (b2) a plurality of times. Exposure control signal (b2) is identical to exposure control signal (b1).

The third exposure period is formed by repeating a basic unit including a set of the emission control signal (a) and exposure control signal (b3) a plurality of times. The third exposure period is a period for acquiring the background light BG.

As described above, the exposure control signal in the first exposure period and the second exposure period is adjusted at timing at which exposure to reflected light from the object at the first distance can be performed but exposure to reflected light from the object at the second distance (longer than the first distance) cannot be performed.

The repeating of the exposure control signal in the first exposure period and the exposure control signal in the second exposure period at the same timing relative to the emission control signal is intended to carry out exposure at the same timing to obtain a light intensity signal since the light intensity of the reflected light from, for example, the oil and fat is small. Moreover, there is an advantage that a calculation equation of the light intensity signal can be directly utilized. It is needless to say that such pulse setting may be made only for the first exposure period or the second exposure period.

Moreover, the light intensity of the reflected light from, for example, the oil and fat is small, and in order to detect the small light intensity, the total number of times of repeating (or the total number of times of setting) the emission control signal and the exposure control signal needs to be increased. Thus, the light intensity of the reflected light returning from the object when the exposure control signal indicates exposure stop increases, which may cause "leakage" of the light at such a level that cannot be ignored by the solid-state image sensor. The "leakage" is a phenomenon that exposure to slight light is performed even in a state in which the emission control signal indicates the exposure stop.

Since the light intensity signal generated by the aforementioned "leakage" is cancelled out together with BG subtraction, distance measurement device 100 repeatedly makes the emission control signal valid even in the third exposure period. That is, distance measurement device 100 can suppress the influence of the leakage even under condition that the "leakage" occurs.

Next, actual pulse waveforms will be described. The actual pulse waveforms are not ideal rectangular pulse waveforms illustrated in FIG. 4A but have dullness in a rising edge and a falling edge.

Figure 5:
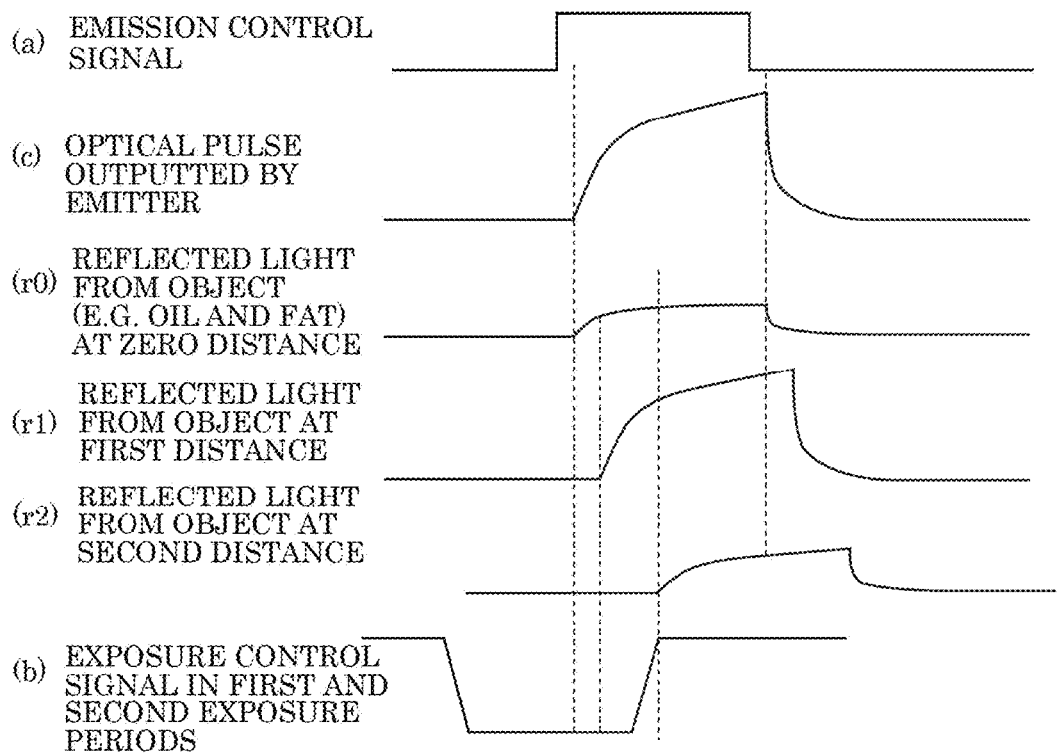
FIG. 5 is a diagram illustrating an example of actual pulse waveforms for the distance data reliability determination according to Embodiment 1.

FIG. 5 is a diagram illustrating an example of the actual pulse waveforms for the distance data reliability determination according to Embodiment 1. In the figure, symbol (a) represents an emission control signal. Symbol (c) represents an optical pulse outputted by emitter 104. Symbol (r0) represents reflected light from the object (for example, the oil and fat) at the zero distance. Symbol (r1) represents reflected light from the object at the first distance. Symbol (r2) represents reflected light from the object at the second distance. Symbol (b) represents the exposure control signal in the first and second exposure periods. Each of the signal waveforms is schematically written so as to be similar to the actual pulse waveform.

In FIG. 5, the optical pulse (c) does not rise abruptly and has an inclination. Therefore, reflected light (r0), (r1), and (r2) also have similar waveforms.

Regarding reflected light (r0), under the presence of semitransparent dirt at such a level that is invisible to naked eyes without attention, reflected light from the object (for example, the oil and fat) at the zero distance has a small amplitude. Moreover, a rise of the optical pulse (c) has an inclination, and thus the first half of the reflected light has an even smaller amplitude.

The exposure control signal in the first and second exposure periods is set at timing at which exposure to reflected light from the first distance is performed and exposure to reflected light from the second distance is not performed. Since there are, for example, individual variation of emitter 104 and a transmission delay difference between the control signals, the timing of the exposure control signal in the first and second exposure periods may be determined by a method for obtaining a light intensity signal while shifting a start phase in fine units.

Next, the light intensity signal for each pixel obtained through the emission and exposure control for the reliability determination illustrated in FIG. 4A, a signal intensity threshold value for the reliability determination, and the start phase of the exposure control signal will be described.

FIG. 6A is a diagram illustrating a threshold value in the distance data reliability determination according to Embodiment 1. A horizontal axis in the figure represents the start phase of the exposure control signal in the first and second exposure periods. That is, the start phase represents pulse start timing of the exposure control signal in the first and second exposure periods relative to the pulse of the emission control signal.

A vertical axis represents the light intensity signal of the reflected light received by light receiver 102. The figure indicates four types of light intensity signals. Each black circle mark represents reflected light from the object at the second distance under the absence of dirt on the cover glass. Each triangle mark represents reflected light from the object at the second distance under the presence of dirt on the glass cover. Each diamond shaped mark represents reflected light from the object at the first distance under the absence of dirt on the glass cover. A square mark represents reflected light from the object at the first distance under the presence of dirt on the glass cover.

Of the light intensity signals described above, the light intensity signal marked by the black circle indicates a small value across a wide range of start phase, and the other marks become greater with an increase in the start phase.

The black circle and triangle marks represent a clear level difference depending on the presence and absence of dirt in the light intensity signal. Therefore, it is possible to determine the presence or absence of dirt through threshold value determination using a threshold value example (light intensity threshold value) as illustrated in the figure. Moreover, an example of phase setting may be defined within a range which eases the threshold value determination.

Note that the light intensity threshold value may be determined with a fixed margin relative to the signal level of reflected light with high reflectance from the object at the second distance.

Figure 6B:
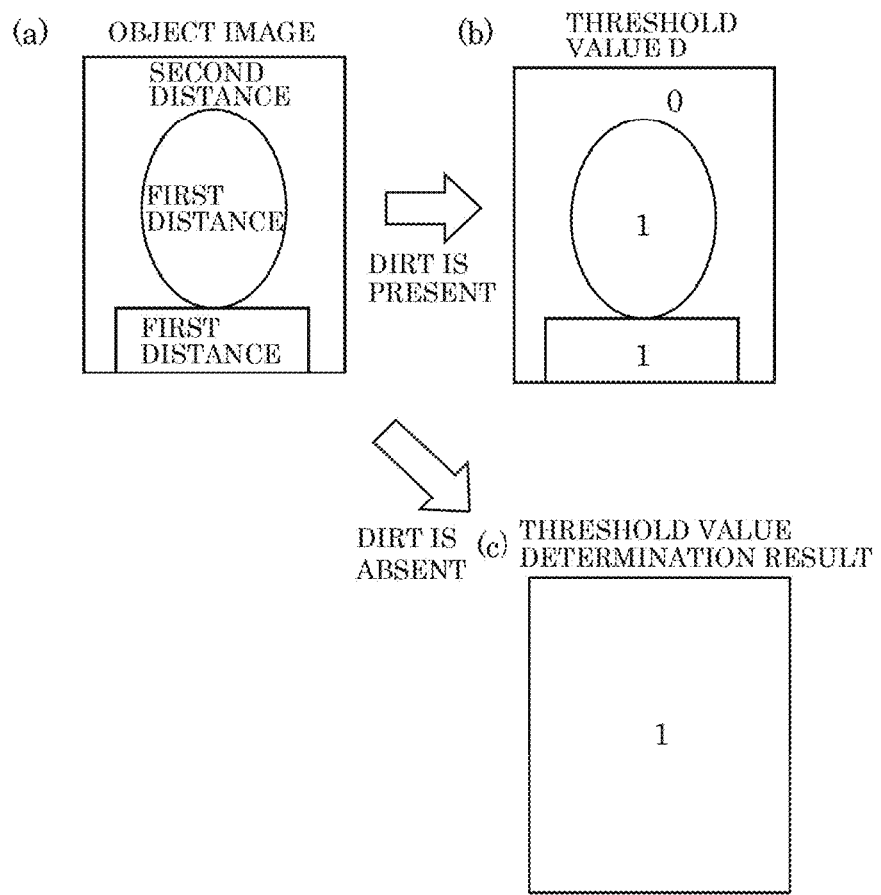
FIG. 6B is a diagram illustrating threshold value determination in the distance data reliability determination according to Embodiment 1.

FIG. 6B is a diagram illustrating the threshold value determination in the distance data reliability determination according to Embodiment 1. Symbol (a) in the figure represents one frame of an object image. The object image corresponds to, for example, a case where it is self-photographed with a smartphone, and illustrated is an example in which an object is present at the first distance with a distant scene reflected on the background. The frame has a light intensity signal for each pixel through the emission and exposure control of FIG. 4A.

Symbol (b) in the figure represents a result of the threshold value determination for each pixel under the absence of dirt on the cover glass. In the symbol (b) in the figure, the total number of pixels below the threshold value ($1'b0$) is greater than a predetermined number. Consequently, it is determined that no problem is found in the reliability of the distance data.

Symbol (c) in the figure represents a result of the threshold value determination for each pixel under the presence of dirt on the cover glass. For the purpose of easy description, assumed in the figure is condition that the dirt is present on the entire front surface of the cover glass of the distance measurement device. In symbol (c) in the figure, the total number of pixels below the threshold value ($1'b0$) is smaller than the predetermined number. Consequently, it is determined that the reliability of the distance data is low.

Specifically, for example, it is determined in FIG. 6B that no problem is found in the reliability of the distance data when there is a large portion of the pixels below the threshold value ($1'b0$) (when the total number of pixels is greater than the predetermined number) on one frame having the light intensity signal for each pixel. Moreover, it is determined that the reliability of the distance data is low when there is a small portion of pixels below the threshold value ($1'b0$) (when the total number of pixels is smaller than the predetermined number).

Moreover, in FIG. 6B, the predetermined number of pixels for the distance data reliability determination may be set to a value in view of variation between the pixels.

Next, a first operation example and a second operation example of the distance data reliability determination will be described. The first operation example illustrates an example in which all pixels included in one frame is targeted for the threshold value determination. The second operation example illustrates an example in which the pixels included in a specific area of one frame is targeted for the threshold value determination.

FIG. 7A is a flowchart illustrating the first operation example of the distance data reliability determination according to Embodiment 1.

First, emission and exposure controller 101 applies pulse setting for the distance data reliability determination (S10). Data processor 103 acquires one frame of light intensity data (S11) and clears a counter (S12). The counter is provided for counting the total number of pixels with which the light intensity data is less than or equal to the threshold value (the total number of pixels corresponding to the absence of dirt) and the counter is also called a weak light intensity counter.

Data processor 103 selects one pixel and compares the light intensity data with the threshold value (S13). Data processor 103 increments the counter by 1 (S15) when the light intensity data is less than or equal to the threshold value (yes in S14) and does not increment the counter by 1 when the light intensity data is neither less than nor equal to the threshold value (no in S14).

Further, data processor 103 determines whether or not the threshold value determination has ended for all the pixels (S16) and returns to step S13 when it is determined that the threshold value determination has not ended yet.

Upon determining that the threshold value determination has ended, data processor 103 determines whether or not the counter value is less than or equal to a predetermined value (S17). Upon determining that the counter value is less than or equal to the predetermined value, data processor 103 determines that the reliability of the distance data is low (S18) and upon determining that the counter value is neither less than nor equal to the predetermined value, data processor 103 determines that no problem is found in the reliability of the distance data (S19).

After steps S18 and S19, data processor 103 instructs emission and exposure controller 101 to apply pulse setting for TOF (distance measurement) (S20).

Such an operation permits the distance data reliability determination to be made by using the fact that the light intensity data is greater than or equal to the threshold value on a large portion of the screen under the presence of oil and fat dirt of the cover glass.

Figure 7B:
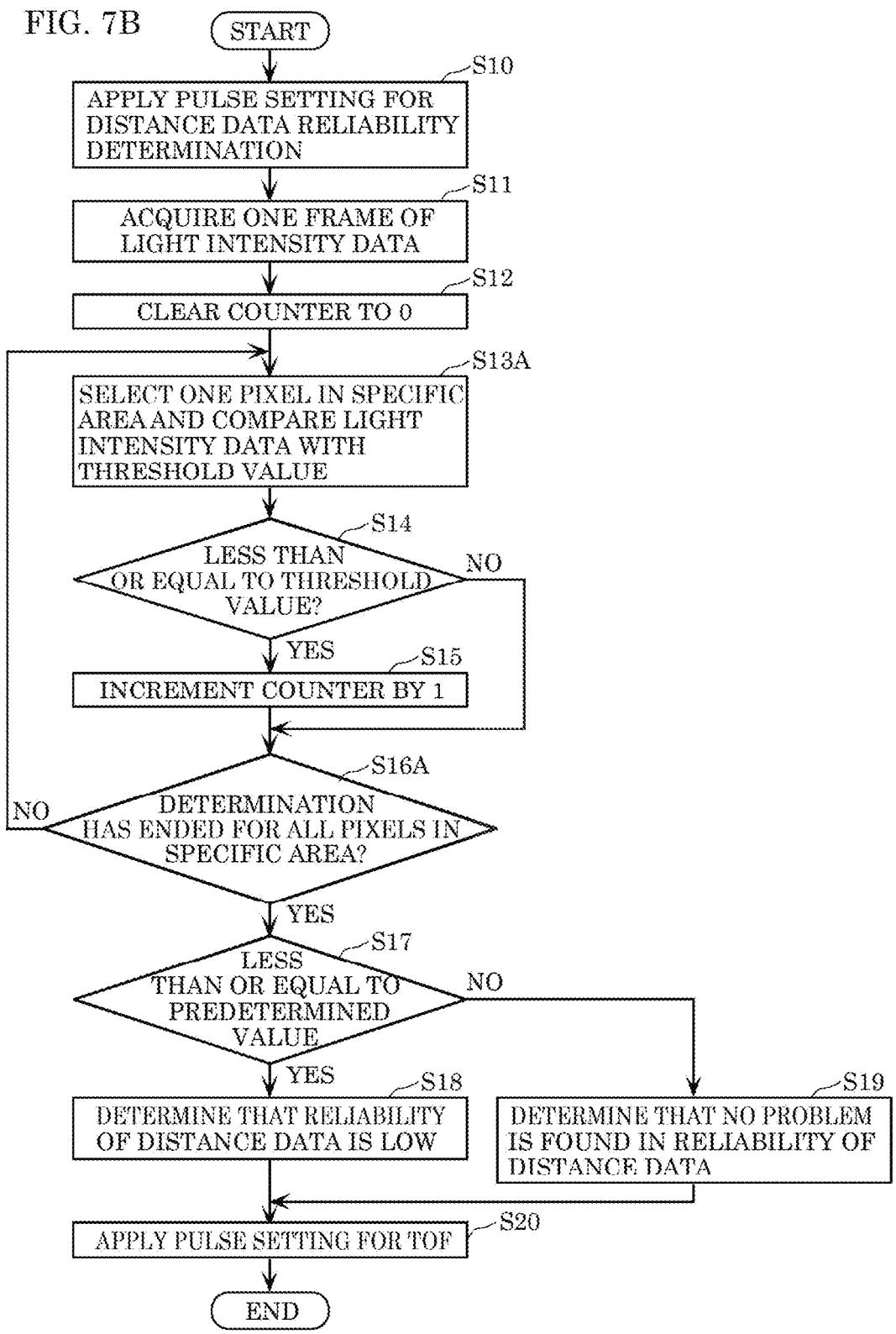
FIG. 7B is a flowchart illustrating a second operation example of the distance data reliability determination according to Embodiment 1.

FIG. 7B is a flowchart illustrating the second operation example of the distance data reliability determination according to Embodiment 1. The second operation example differs from the first operation example in that not all the pixels included in one frame but those included in the specific area are targeted for the threshold value determination. Thus, FIG. 7B differs from FIG. 7A in that steps S13A and S16A are provided instead of steps S13 and S16. The description below is focused on different points.

In step S13A, data processor 103 selects one pixel in the specific area and compares the light intensity data with the threshold value. The specific areas may be a region where a distance scene can be reflected, for example, any region of four corners in the frame.

In step S16A data processor 103 determines whether or not the threshold value determination has ended for all the pixels in the specific area, and returns to step S13 upon determining that the threshold value determination has not ended yet.

An area where the total number of pixels with a predetermined signal level or below is counted is narrowed down to the specific area through such an operation, which makes it possible to reduce the calculation processing amount in the distance data reliability determination.

As described above, the distance measurement device according to Embodiment 1 includes: emitter 104 which emits irradiation light in accordance with an emission instruction; light receiver 102 which includes solid-state image sensor 12 that performs exposure using reflected light corresponding to the irradiation light; emission and exposure controller 101 which controls emission timing and an emission period of the irradiation light for emitter 104 and controls exposure timing and an exposure period of the reflected light for solid-state image sensor 12; and data processor 103 which includes calculator 113 for calculating distance data and light intensity data based on signals of pixels outputted by light receiver 102. Emission and exposure controller 101 controls the exposure timing to perform exposure to reflected light from the first distance and not to perform exposure to reflected light from the second distance longer than the first distance in the distance measurement range. Data processor 103 includes determination unit 112 which determines the reliability of the distance data in accordance with the signal amount of the light intensity data for each of the pixels.

Here, data processor 103 may count the total number of pixels with which the light intensity data is at a level less than or equal to a preset signal level and determine the reliability of the distance data.

Here, when the total number of pixels with which the light intensity data is at the level less than or equal to the preset signal level is less than or equal to a preset number, data processor 103 may determine that the reliability of the distance data is low.

Here, data processor 103 may determine the reliability of the distance data based on at least a predetermined region within the screen.

Here, when the distance data calculated by calculator 113 is smaller than a predetermined distance value across the entire screen, data processor 103 may not determine that the reliability of the distance data is low.

Here, data processor 108 may determine, as the determination of the reliability of the distance data, whether the distance data is real distance data or false distance data.

Moreover, a reliability determination method according to Embodiment 1 is a method for determining the reliability of distance data of a distance measurement device and includes: emitting irradiation light from the distance measurement device; performing exposure at timing at which exposure to reflected light from a first distance is performed and exposure to reflected light from a second distance longer than the first distance in a distance measurement range is not performed in the distance measurement device; and determining the reliability of the distance data in accordance with a signal amount of light intensity data for each pixel obtained through the exposure in the distance measurement device.

Embodiment 2

A configuration example of determining the presence or absence of an object before reliability determination according to the present embodiment will be described. In the reliability determination operation, in response to a result of the object presence or absence determination, threshold value determination is performed on the pixels located in a portion where the object is absent.

FIG. 8 is a diagram illustrating a pulse setting example for detecting the presence or absence of the object according to Embodiment 2. In the figure, an exposure control signal (b) is set at timing at which exposure to reflected light (r0) is not performed and exposure to reflected light (r1) and reflected light (r2) are performed. In other words, the exposure control signal in the first and second exposure periods is set at timing at which exposure to reflected light from the object (for example, oil and fat) at the zero distance is not performed but exposure to reflected light from the first distance (a close end of the measurement distance range is assumed) and a distance longer than the first distance is performed.

Note that since there are actually individual difference between emitters, a transmission delay difference between different control signals, etc., the timing of the exposure control signal in the first and second exposure periods may be determined by a method for acquiring a light intensity signal while shifting a start phase in fine units.

FIG. 9 is a diagram illustrating object presence or absence determination and reliability determination according to Embodiment 2. In the figure, as a result of determination at pulse setting for detecting the presence or absence of the object, it is determined that the object is present ("1") when the light intensity data for each pixel is greater than or equal to a second predetermined signal level, and it is determined that the object is absent ("0") when the aforementioned light intensity data is less than the second predetermined signal level. Note that a third distance is a distance farther than the first distance and closer than the far end of the measurement distance.

Data processor 103 carries out the object presence or absence determination and, focusing on only the pixels for which 0 is determined (the object is absent), counts the total number of pixels with which the light intensity signal is smaller than a predetermined light intensity threshold value. Then under the condition that a counter value of the aforementioned counter (weak light intensity counter) is smaller than a predetermined number, it is determined that the reliability of the distance data is low.

Figure 10:
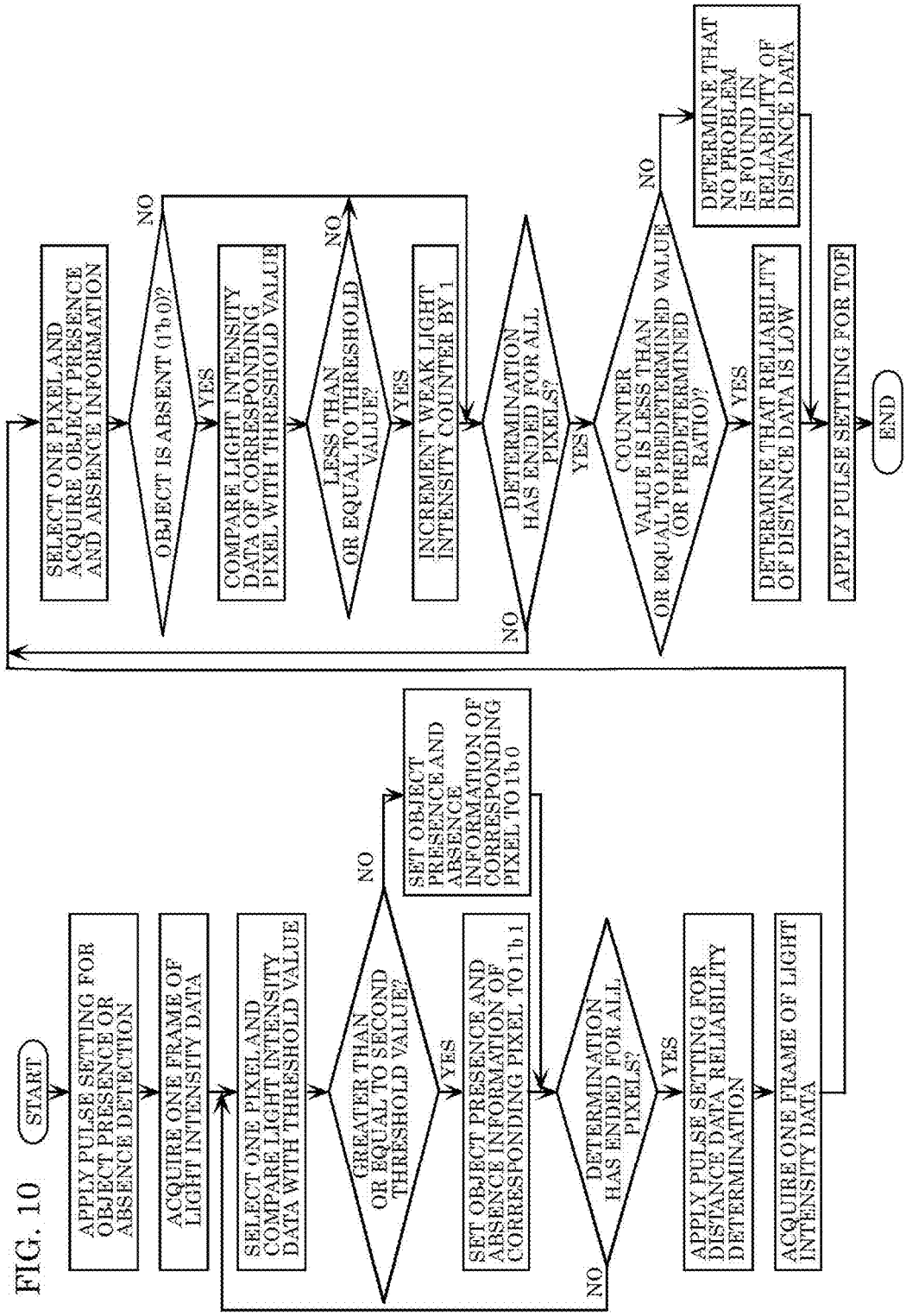
FIG. 10 is a flowchart illustrating an operation example of the object presence or absence determination and the reliability determination according to Embodiment 2.

FIG. 10 is a flowchart illustrating an operation example of the object presence or absence determination and the reliability determination according to Embodiment 2. The left side of FIG. 10 illustrates the object presence or absence determination illustrated in FIG. 9. For all the pixels for which it is determined that the object is absent in FIG. 10, an operation of the reliability determination similar to that of FIGS. 7A and 7B is illustrated.

Consequently, the pixels at which the object is absent are specified before the reliability determination is carried out, which therefore brings about effect that erroneous distance data reliability determination can be reduced.

Moreover, there is provided effect that it is possible to determine whether or not a state corresponds to a state in which the distance data reliability determination cannot be performed, for example, a state in which the entire screen displays the object.

As described above, data processor 103 determines the reliability of the distance data based on at least a predetermined region within the screen in the distance measurement device according to Embodiment 2.

Here, the predetermined region may be a portion where the object is absent.

Here, emission and exposure controller 101 may perform exposure control at exposure timing at which no reflected light is included.

Embodiment 3

An example in which the accuracy in the reliability determination is increased by use of distance data in the present embodiment will be described. More specifically, it is not determined in Embodiment 3 that the reliability of the distance data is low when the distance data calculated by the calculator is smaller than (close to) a predetermined threshold value across the entire screen. Consequently, the accuracy in the reliability determination increases.

Figure 11A:
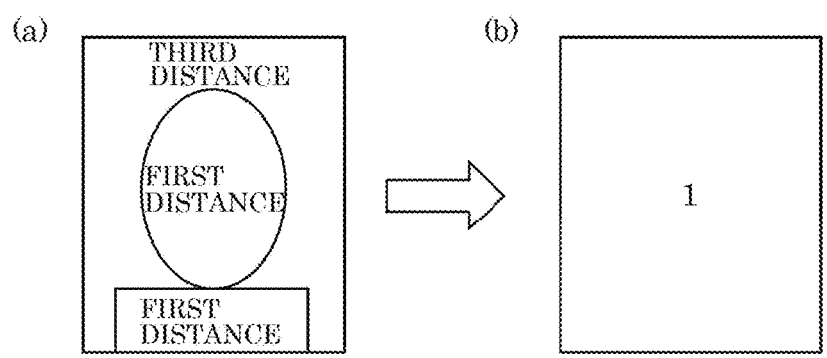
FIG. 11A is a diagram illustrating a reliability determination operation according to Embodiment 3.
Figure 11B:
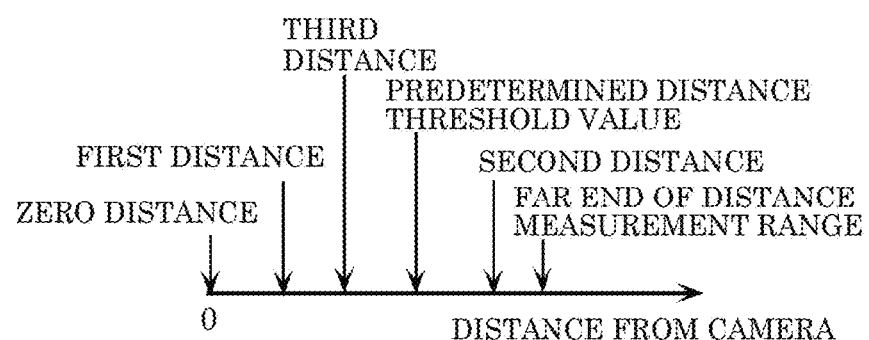
FIG. 11B is a diagram illustrating a zero distance, a first distance, a second distance, and a third distance according to Embodiment 3.

FIG. 11A is a diagram illustrating a reliability determination operation according to Embodiment 3. FIG. 11B is a diagram illustrating a zero distance, a first distance, a second direction, and a third distance according to Embodiment 3. Symbol (a) in FIG. 11A illustrates an image of an object in which a count number of pixels with which the distance data is less than or equal to the predetermined threshold value is greater than or equal to a predetermined number. That is, the distance data of all the pixels is smaller than a predetermined distance threshold value of FIG. 11B and the object is present at a close position. For example, the first distance corresponds to a user who performs self-photographing and the third distance corresponds to a background wall on which the user leans.

In this case, as illustrated in (b) of FIG. 11A, data processor 103 determines that no problem is found in the reliability of the distance data although the total number of pixels with which the distance data is less than or equal to the predetermined threshold value (1′b0) is smaller than the predetermined number. In other words, it is not determined that the reliability of the distance is low even when the total number of weak light intensity counters at the pulse setting for the distance data reliability determination is less than or equal to the predetermined threshold value in a case where the total number of pixels with which the distance data acquired at the pulse setting for TOF is smaller than (close in distance to) the predetermined threshold value is greater than the predetermined number.

Note that the predetermined threshold value of the weak light intensity counter may be reduced in case of (a) of FIG. 11A.

Consequently, there is provided effect that erroneous reliability determination is reduced, compared to Embodiments 1 and 2.

Figure 12:
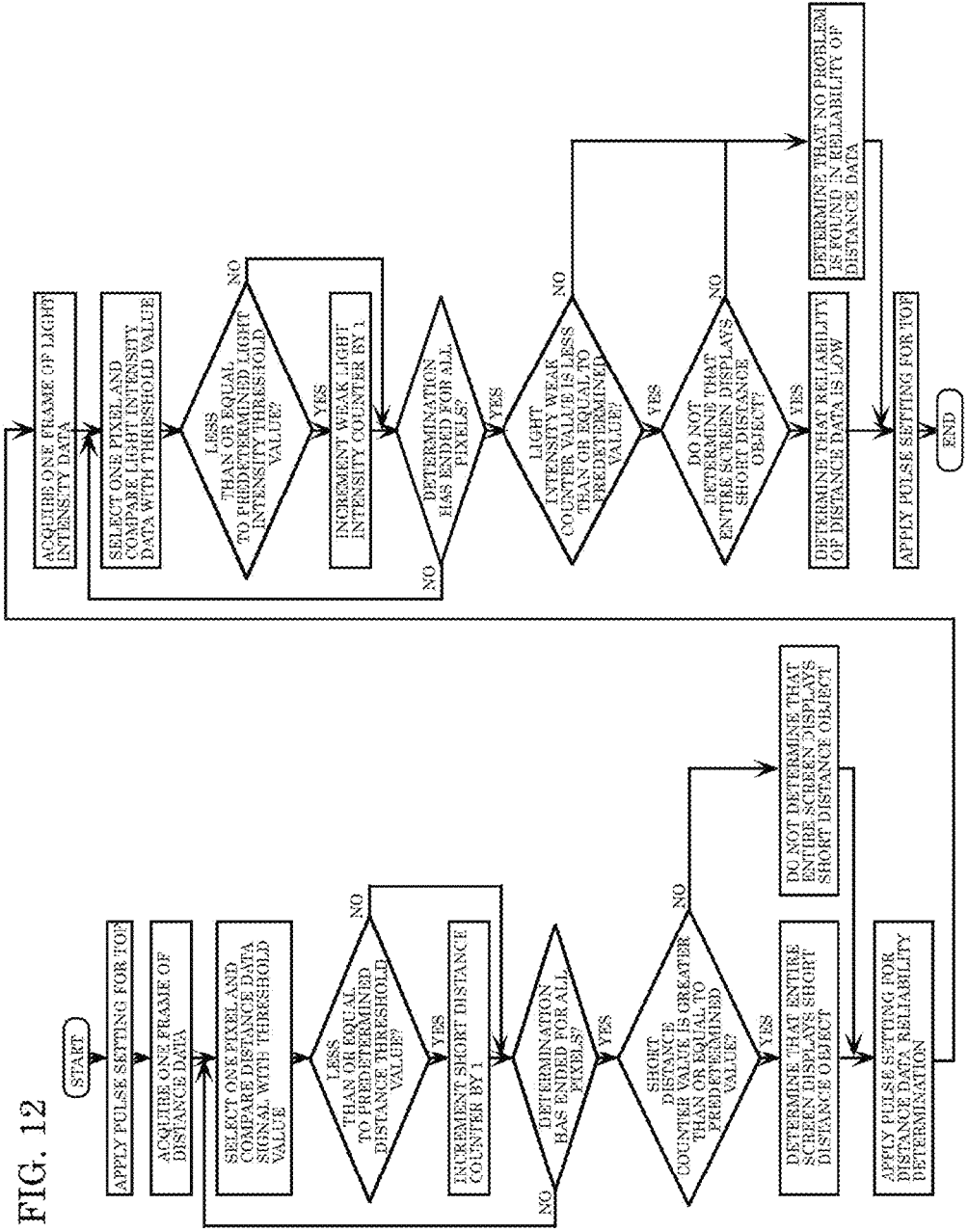
FIG. 12 is a flowchart illustrating an operation example of the reliability determination according to Embodiment 3.

The reliability determination according to Embodiment 3 may be executed as in a flowchart illustrated in FIG. 12. Note that the area where the light intensity signal is determined may include all the pixels in a specific area even on the entire screen (one frame of all the pixels).

As described above, data processor 103 varies a determination criterion for the reliability of the distance data in accordance with the size of the distance data calculated by calculator 113 in the distance measurement device according to Embodiment 3.

Embodiment 4

An example of timing at which the distance data reliability determination operation is carried out in the present embodiment will be described.

Figure 13:
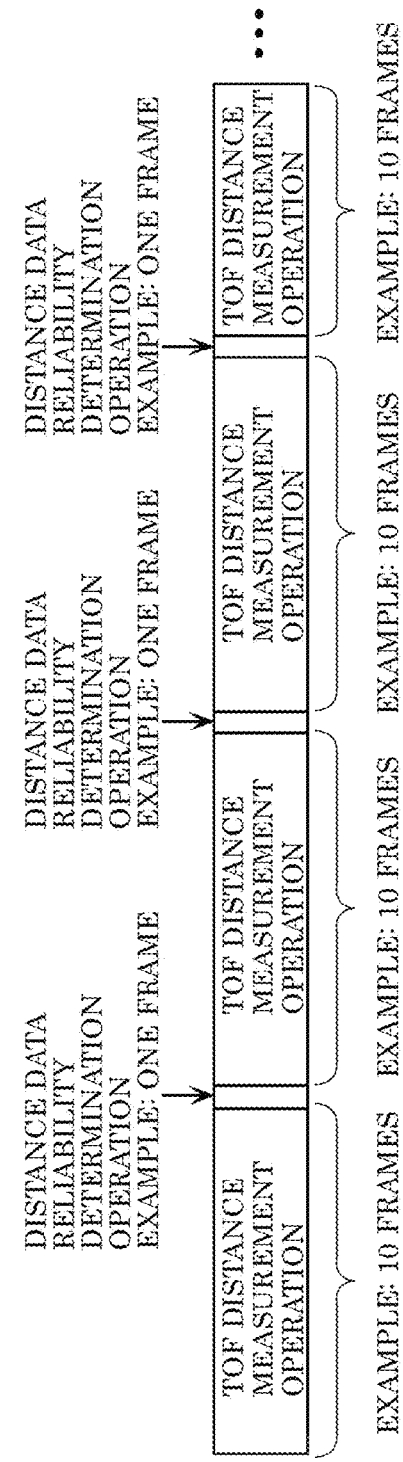
FIG. 13 is a diagram illustrating an example of timing of carrying out reliability determination according to Embodiment 4.

FIG. 13 is a diagram illustrating an example of timing at which the reliability determination is carried out according to Embodiment 4. In the figure, the distance data reliability determination operation is inserted between TOF distance measurement operations.

Note that it may be determined that the reliability of the distance data is low when the count number of pixels with which even one frame of light intensity signal is less than or equal to a threshold value has become less than or equal to a predetermined number. For example, it may be determined that the reliability of the distance data is low when the aforementioned state continues for a plurality of frames. A method for determining the reliability of the distance data when the plurality of frames have continued provides effect that erroneous determination is reduced.

As described above, in the distance measurement device according to Embodiment 4, emission and exposure controller 101 performs, at the different frames, emission and exposure control for calculating the distance data and emission and exposure control for determining the reliability.

Embodiment 5

An example in which the reliability determination is performed not for one frame only but under condition that the same results of determination continue for a plurality of frames in the present embodiment will be described.

Figure 14:
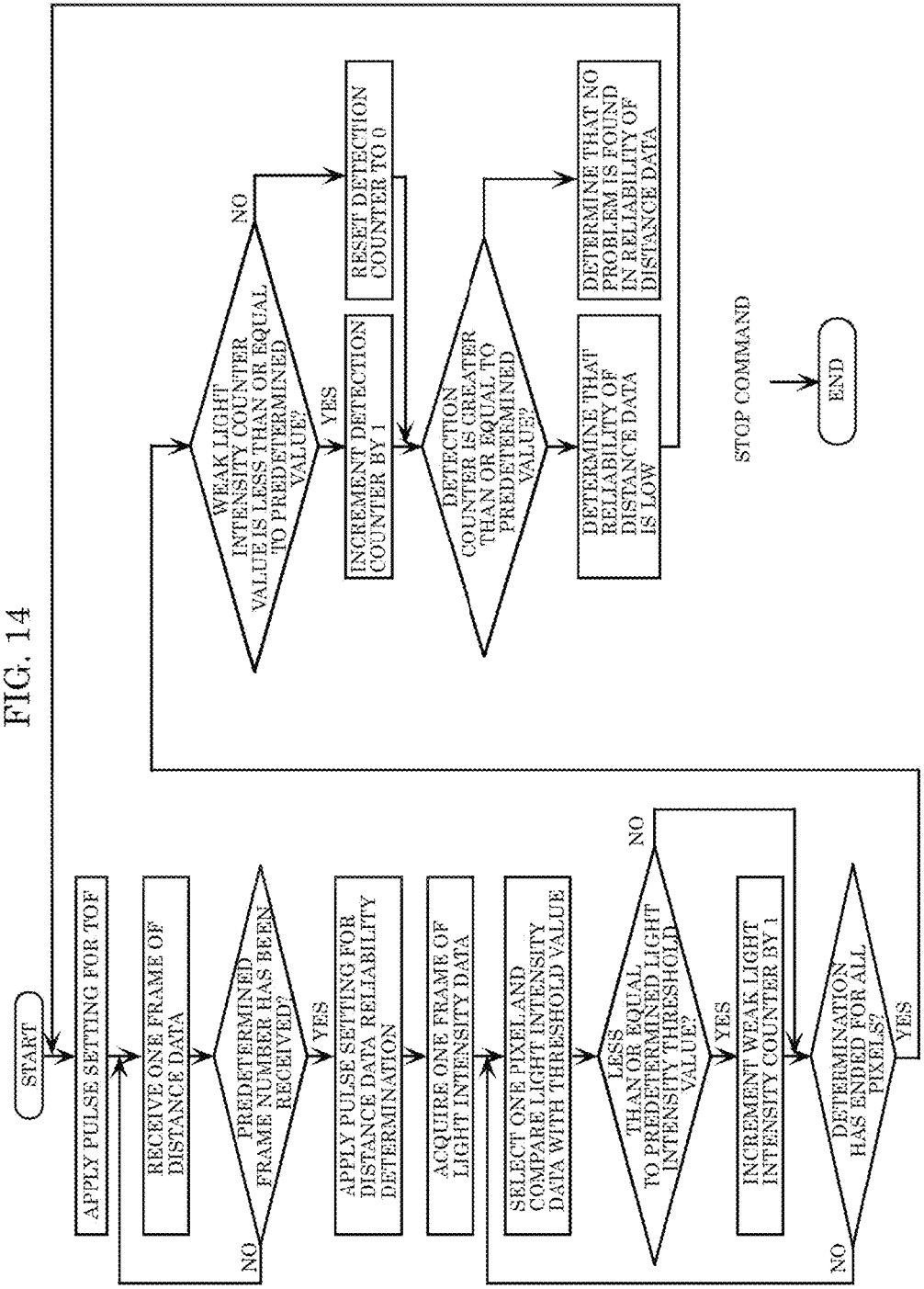
FIG. 14 is a flowchart illustrating an operation example of reliability determination according to Embodiment 5.

FIG. 14 is a flowchart illustrating an operation example of the reliability determination according to Embodiment 5. It is determined in the figure that the reliability is low when frames where the weak light intensity counter value is less than or equal to a predetermined value (that is, frames where it is determined in Embodiments 1 to 4 that the reliability is low) continue over a plurality of frames greater than or equal to the predetermined value.

Consequently, it is possible to improve the accuracy in the reliability determination.

As described above, data processor 103 in a distance measurement device according to Embodiment 5 determines that the reliability of the distance data is low when condition that the total number of pixels with which the light intensity data is less than or equal to a preset signal level is less than or equal to a preset number continues over the plurality of frames.

Note that each of the components in each of the embodiments described above may be formed by dedicated hardware or may be realized by executing a software program suitable for each of the components. Each component may be realized by reading and executing a software program recorded on a recording medium such as a hardware disc or a semiconductor memory by a program execution unit such as a CPU or a processor.

The distance measurement devices according to one or a plurality of modes of the present disclosure have been described above based on the embodiments, but the present disclosure is not limited to these embodiments. A mode obtained by making various modifications conceivable to those skilled in the art to the embodiments and a mode formed by combining together the components in the different embodiments may also be included in the scope of one or a plurality of modes of the present disclosure.

INDUSTRIAL APPLICABILITY

The present disclosure is applicable as a distance measurement device to, for example, a TOF type camera.

What is claimed is:

1. A distance measurement device, comprising:
an emitter which emits irradiation light in accordance with an emission instruction;
a light receiver which includes a solid-state image sensor that performs exposure using reflected light corresponding to the irradiation light;
an emission and exposure controller which controls emission timing and an emission period of the irradiation light for the emitter and controls exposure timing and an exposure period of the reflected light for the solid-state image sensor; and
a data processor calculates distance data and light intensity data based on signals of pixels outputted by the light receiver, wherein:
the emission and exposure controller controls the exposure timing to perform exposure to reflected light from a first distance and not to perform exposure to reflected light from a second distance longer than the first distance in a distance measurement range, and
the data processor counts a total number of pixels with which the light intensity data is less than or equal to a preset signal level, and determines reliability of the distance data in accordance with the total number of pixels.

2. The distance measurement device according to claim 1, wherein the data processor determines that the reliability of the distance data is low when the total number of pixels with which the light intensity data is less than or equal to the preset signal level is less than or equal to a preset number.

3. The distance measurement device according to claim 1, wherein the data processor determines the reliability of the distance data based on at least a predetermined region in a screen.

4. The distance measurement device according to claim 3, wherein the predetermined region is a portion where an object is absent.

5. The distance measurement device according to claim 1, wherein the data processor determines that the reliability of the distance data is low when a state in which the total number of pixels with which the light intensity data is less than or equal to the preset signal level is less than or equal to a preset number continues across a plurality of frames.

6. The distance measurement device according to claim 1, wherein the data processor changes a criterion for determining the reliability of the distance data in accordance with a size of the distance data calculated.

7. The distance measurement device according to claim 1, wherein the emission and exposure controller controls exposure at exposure timing including no reflected light.

8. The distance measurement device according to claim 1, wherein the emission and exposure controller performs, with different frames, emission and exposure control for calculating the distance data and emission and exposure control for determining the reliability.

9. The distance measurement device according to claim 1, wherein the data processor determines, as determination of the reliability of the distance data, whether the distance data is real distance data or false distance data.

10. A distance measurement device, comprising:
an emitter which emits irradiation light in accordance with an emission instruction;
a light receiver which includes a solid-state image sensor that performs exposure using reflected light corresponding to the irradiation light;
an emission and exposure controller which controls emission timing and an emission period of the irradiation light for the emitter and controls exposure timing and an exposure period of the reflected light for the solid-state image sensor; and
a data processor which includes a calculator that calculates distance data and light intensity data based on signals of pixels outputted by the light receiver, wherein:
the emission and exposure controller controls the exposure timing to perform exposure to reflected light from a first distance and not to perform exposure to reflected light from a second distance longer than the first distance in a distance measurement range, and
the data processor does not determine that the reliability of the distance data is low when the distance data calculated by the calculator is smaller than a predetermined distance value all over a screen.

11. A method for determining reliability of distance data of a distance measurement device, the method comprising:
emitting irradiation light from the distance measurement device;
performing exposure at timing at which exposure to reflected light from a first distance is performed and exposure to reflected light from a second distance longer than the first distance in a distance measurement range is not performed in the distance measurement device;
counting a total number of pixels with which light intensity data for each pixel obtained through the exposure in the distance measurement device is less than or equal to a preset signal level; and
determining the reliability of the distance data in accordance with the total number of pixels.

* * * * *